United States Patent [19]

Kawar

[11] 4,013,442
[45] Mar. 22, 1977

[54] PROCESS FOR ENCAPSULATING PARTICLES BY IN-SITU FORMATION OF A METAL CARBONATE COATING

[75] Inventor: Faisal T. Kawar, Somerville, N.J.

[73] Assignee: Exxon Research and Engineering Company, Linden, N.J.

[22] Filed: May 10, 1971

[21] Appl. No.: 141,968

[44] Published under the second Trial Voluntary Protest Program on March 30, 1976 as document No. B 141,968.

Related U.S. Application Data

[62] Division of Ser. No. 796,231, Feb. 3, 1969, abandoned.

[52] U.S. Cl. .................................. 71/28; 71/63; 71/64 E; 427/180; 427/201; 427/212; 427/215; 427/343
[51] Int. Cl.² .................................. C05C 9/00
[58] Field of Search ....... 117/100 A, 100 B, 106 R, 117/169 R; 71/28, 63, 64 E; 427/180, 201, 212, 215, 343

[56] References Cited

UNITED STATES PATENTS

| 2,644,769 | 7/1953 | Robinson | 117/100 B |
| 2,725,397 | 11/1955 | Dijksman et al. | 260/555 |
| 3,041,159 | 6/1962 | Smith | 117/100 B |
| 3,148,945 | 9/1964 | Griffith et al. | 117/100 B |
| 3,362,846 | 1/1968 | Lee et al. | 117/169 R |

FOREIGN PATENTS OR APPLICATIONS

| 826,815 | 1/1960 | United Kingdom | 117/100 B |

Primary Examiner—Ronald H. Smith
Assistant Examiner—Dennis C. Konopacki
Attorney, Agent, or Firm—Robert J. Baran

[57] ABSTRACT

Particles, such as fertilizer, are encapsulated with a metal carbonate coating by initially coating the particles with a metallic hydroxide, metallic oxides or mixtures thereof and subjecting the coated particles to an atmosphere containing carbon dioxide so as to convert the metallic compounds to the corresponding carbonate. Inert materials such as powdered limestone can be included with the coating.

10 Claims, No Drawings

(54) 4,013,442

PROCESS FOR ENCAPSULATING PARTICLES BY IN-SITU FORMATION OF A METAL CARBONATE COATING

CROSS REFERENCES TO RELATED APPLICATIONS

This is a division of application Ser. No. 796,231 filed Feb. 3, 1969 now abandoned.

PRIOR ART

The present invention is essentially directed to the problem of caking. Caking is caused by the individual particles in a mass of particulate matter becoming cemented together during storage, so that they lose their desirable free-flowing property. The effect of caking can vary from a lightly set mass, to a "tombstone" which can only be made fit for use by milling. This cementing is normally caused by recrystallization of soluble material between particles. Moisture, pressure, and fine material accelerate the process and increase the hardness of the caked mass.

Coating methods for the prevention of caking rely on the presence of material on the exterior surface of particles to prevent the formation of continuous bridges of crystalline matter between them. Materials that have been used for this purpose include finely divided powders, coating films and hydrophobic substances.

In regard to the use of powders as coating substances, it is well recognized that the effectiveness of the coating agent is closely related to its bulk. Exemplary of conventional coating agents are hydrated silica, calcium and magnesium silicates, diatomaceous earth, kaolin clay, finely ground calcium carbonate and insoluble hydroxides, etc. Various processes have been used to prepare coated particles, ranging from simple admixture of the particles and the coating powder to the utilization of fluidized beds composed of particles of coating material through which the particles move. Other known methods include mixing a binder with the coating material, whereby adhesion of the coating material to the particle is dependent on the binder material acting as a glue. However, in general, the usual, known coating processes ordinarily depend on dusting the particles with the coating powder, or upon mechanical means for applying the coating to the particle.

Illustrative of representative old coating methods are those shown in U.S. Pat. No. 2,041,088 which discloses preparation of a powder coating of calcium carbonate or a mixture of calcium carbonate and ammonium nitrate to fertilizer particles. U.S. Pat. No. 2,136,069 moreover, discloses powder coatings such as calcium carbonate on fertilizers. In addition, U.S. Pat. No. 2,725,397 refers to powder coatings of magnesium carbonate on fertilizers.

Microscopic observation of the conventional coated particles prepared by the usual known methods reveals that the coating material adheres loosely to the particle and is composed of random discrete particles which do not completely cover the exterior surface of the particle and which are easily dislodged therefrom. Carbonate coated particles produced by such methods, moreover, are easily susceptible to removal of the protective coating by moisture, pressure and general handling. An additional drawback is the inherent imperfection of the coating surface which allows moisture to easily penetrate to the particle, disintegrate the coating, and initiate the caking process. Coatings produced by such methods disintegrate easily on contact with moisture. Thus, the particle coated according to the previously known methods remains easily susceptible to moisture, pressure, handling and the other factors conducive to caking, disadvantages which are now overcome by application of the methods employed in the present invention.

FIELD OF THE INVENTION

This invention relates generally to the encapsulation of particles by a capsule composed of a substantially water insoluble metallic carbonate salt. More particularly, this invention relates to a process for the encapsulation of metallic hydroxide or oxide salt coated particles whereby a carbonation reaction, taking place on the exterior surface of the particle results in the particle being encapsulated by a hard, crystallinelike continuous capsule of low-porosity composed of a substantially water insoluble carbonate salt which is capable of inhibiting the caking of the encapsulated particle.

SUMMARY OF THE INVENTION

It has been discovered that a hard, crystalline-like, continuous, metal carbonate capsule of low porosity is obtained if the particle, rather than being dusted with the finely divided metal carbonate salt, is coated initially with the corresponding hydroxide or oxide of the specific metal carbonate salt intended as the encapsulating material and then carbonated by subjecting the coating to treatment by a source of $CO_2$, thereby resulting in an in situ conversion of the hydroxide or oxide to the corresponding carbonate on the surface of the particle.

It is to be understood that the term "particle" is used in the present invention in the same sense as it is generally used in the coating art and particularly in the fertilizer coating art, i.e., as an agglomerative unit composed of actual particles, which unit constitutes an agglomeration of matter of sufficient size so as to be handleable as regards coating and which is normally considered of a practical size to be the object of a coating process. It is further to be understood that the agglomerative unit contemplated be solid in form, i.e. crystalline, compacted, congealed, etc. Thus, in relation to the fertilizer art, the term "particle" would refer, but not be limited, to conventional crystalline forms, prills, granules, pellets, tablets, etc., and generally, the products of various agglomeration methods as outlined on pages 255 and 256 of "Superphosphate: Its History, Chemistry and Manufacture," a volume issued in December 1964 by the U.S. Department of Agriculture, whose disclosure in this regard is incorporated herein by reference. Obviously, when considering a substance as sodium chloride, the "particle" contemplated for coating would ordinarily be of a somewhat larger size than that found in ordinary table salt, as for example, rock salt, although it is possible according to the present invention, to encapsulate an agglomerative unit of the size found in ordinary table salt.

Additionally, as regards the constitution of the particles contemplated for encapsulation in the present invention, it is to be noted that some substances will undergo reaction on contact with hydroxides or oxides. Thus, particles containing in their constitution the ammonium ion ($NH_4^+$) will undergo reaction on contact with hydroxides and oxides, as for example, ammonium chloride and calcium hydroxide:

$$2NH_4Cl + Ca(OH)_2 \rightarrow CaCl_2 + 2NH_3 + H_2O$$

However, this reaction will be limited to the exterior surface of the particle, resulting in a minute deposition of the reaction product on the exterior surface of the particle and will in no way interfere with subsequent hydroxide or oxide coating and subsequent carbonation-encapsulation of the particle.

Thus, the particulate matter contemplated for encapsulation in the present invention includes, but is not limited to various fertilizer compositions containing urea, substituted ureas, ammonium phosphates, ammonium nitrate, superphosphates, etc.; various inorganic salts such as sodium chloride, potassium chloride, sodium nitrate, potassium nitrate, sodium iodide, potassium iodide, ammonium chloride, etc.; and in general, various solid substances, organic and inorganic in nature, which are subject to caking.

In a preferred form of the present invention, fertilizer particles, which are defined herein as crystals, granules, prills, pellets, tablets, or any of the other conventional forms in which fertilizer particles are produced, are coated with metallic hydroxides or oxides by conventional methods. The fertilizer particles should be wetted, if need is required, for good adherence of the powdered hydroxide or oxide to them. The hydroxide or oxide coated particles are then subjected to an atmosphere of carbon dioxide wherein conversion of the adhering hydroxide to the corresponding carbonate, for example, calcium carbonate, takes place according to the following equation:

$$Ca(OH)_2 + CO_2 \rightarrow CaCO_3 + H_2O$$

thereby effecting an in situ encapsulation of the fertilizer particle by the metal carbonate salt produced. The water produced is removed by the stream of $CO_2$.

The coating effected by the present invention exhibits a hard, dull, crystalline-like finish of low-porosity and encapsulates the particle in a continuous manner as opposed to the prior art coating composed of discrete, individual particles. The product of the present invention shows a marked superiority in noncaking properties over mechanical coatings of varied composition including the known conventional coatings composed of individual discrete particles of calcium carbonate, clays, or diatomaceous earth. Table I, for example, contains data indicating the effectiveness in noncaking properties of various commercially used urea coatings, and urea as encapsulated according to the present invention.

TABLE I

| Coating | Storage Results[1] | | |
|---|---|---|---|
| | %Bag Set | %Cake | Hardness |
| Conventional | | | |
| None | 100 | 32.3 | 2 |
| 2.5% Diamol Diatomaceous Earth | 35 | 0 | — |
| 2.5% Barnet Clay | 11 | 0 | — |
| 2.5% Argirec B-22 Clay | 15 | 0 | — |
| 2.5% Mosam Clay | 50 | 13.0 | 1 |
| 2.5% CC China Clay | 40 | 12.0 | 1 |
| 2.5% SC China Clay | 60 | 19.3 | 2 |
| Present Invention | | | |
| 1.84% CaCO₃ Capsule | 0 | 0 | — |
| 3.44% CaCO₃ Capsule | 0 | 0 | — |

[1]Results are obtained from 2-lb. samples and stored for 4 months under 5 psi pressure.

Table II contains data showing the superiority in noncaking properties of the carbonate capsule of the present invention over known carbonate coatings composed of individual, discrete particles, and uncoated urea fertilizer particles.

TABLE II

| Composition | Storage Time | % Caking |
|---|---|---|
| Prilled urea (conventional) | 5 months | 12 |
| Prilled urea + 2.5% (conventional) CaCO₃ powder | 5 months | 15.4 |
| Prilled urea + 2.8% CaCO₃ capsule | 5 months | 0 |
| Prilled urea + 1.84% CaCO₃ capsule | 5 months | 0 |

The term "metal carbonate salt" as used in the context of this invention, refers to carbonate salts of those metallic elements of the Periodic Table having a solubility in 100 ml of distilled water at room temperature, i.e. about 20°C., of less than 0.1 grams. Thus, the metallic carbonate salts contemplated for use in the present invention are those considered in the art to be substantially water insoluble, as for example, $MgCO_3$ and $CaCO_3$. The more preferred metal carbonate salts are those derived from the lighter elements of the alkaline earth family. The most preferred carbonate salts are those derived from calcium and magnesium. Additionally, this invention can be practiced by using a mixture of the abovementioned group of carbonates, or in combination with a fine ground inert material such as limestone or phosphate rock. In addition, calcium oxide, magnesium oxide and mixtures thereof as found naturally occurring such as calcitic quick lime, dolomitic quick lime, dolomite single hydrated lime, dolomitic double hydrated lime, calcitic hydrated lime, etc. are useful in this invention since they will undergo carbonation to produce the desired product. However, when an oxide is used as the initial coating material, it is necessary to add water in an amount of at least 0.1 percent preferably between 0.1 to 20 percent of the total weight of oxide and particles used in order to initiate conversion of the oxide to the hydroxide form. Addition of a greater amount of water will result in dissolution of particles.

The term "coating" as used herein refers to the mechanical admixture of particles with finely divided forms of the aforementioned oxides, hydroxides and the like to achieve a powdery layer of discrete particles on the surface of the particle. The term "encapsulation" as used herein refers to the process of carbonating particles "coated" according to the above definition, and to the carbonate capsule resulting from the carbonation of the "coated" particle.

As previously mentioned, gaseous $CO_2$ is utilized to effect carbonation of the "coated" particle. While pure carbon dioxide gas is the most preferred, $CO_2$-containing combustion gases, or diluted $CO_2$ from any conventional $CO_2$ source can also be utilized in the practice of this invention.

The present invention can be practiced in the conventional equipment used in various prevalent coating methods. The entire process of the present invention can be performed, e.g., in a conventional coating drum equipped with a means of introducing $CO_2$. The coating material and the particles are introduced into the rotating coating drum and carbon dioxide is introduced when the coating material has adhered to the fertilizer particles. As can be seen from the equation exemplifying the reaction occurring during the practice of this invention, utilizing $Ca(OH)_2$ as an example:

$$Ca(OH)_2 + CO_2 \rightarrow CaCO_3 + H_2O$$

it can readily be seen that the speed of the carbonation reaction can be controlled by varying the pressure of $CO_2$ within the coating drum. Thus, if desired, the drum can be sealed and the pressure of $CO_2$ increased, resulting in an increase in the reaction rate. Alternatively, the reaction rate can be decreased in comparison with the reaction rate being maintained at atmospheric pressure by operating the sealed coating drum at a negative pressure.

The present invention can be operated in a batchwise manner or in a continuous process by utilizing an inclined rotating cylinder. In a continuous process, the particles and the coating material can be introduced at the upper end of the rotating cylinder while the $CO_2$ gas and ensuing carbonation and encapsulation can be confined to the lower end of the drum.

The thickness of the encapsulating material which can be applied in a single carbonation is limited by the amount of coating material which adheres to the fertilizer particle in the initial conventional coating operation. In the case of $CaCO_3$, a single carbonation can result in the formation of a $CaCO_3$ shell constituting up to 20 percent of the total weight of the fertilizer capsule produced. If a thicker capsule is desired, the encapsulated product can be recycled and recapsulated. However, it has been found that a $CaCO_3$ shell constituting 0.25 to 3 percent of the total weight of the fertilizer capsule is sufficient to inhibit caking.

In theory, the operating temperatures employed in the practice of the present invention are limited only by the decomposition point of the particular metal carbonate formed and by the softening point of the particular fertilizer particle to be coated. Thus, the present invention can be practiced at room temperature and at elevated temperatures. However, as the temperature is raised, the molar volume of carbon dioxide is increased, and the increase in reaction rate brought about by increasing the temperature is offset by the decreased carbon dioxide availability per unit volume. The increase in molar volume, however, can be countered by carbonating in a sealed apparatus, thereby maintaining the original molar volume. In practice, it has been found convenient to operate the carbonation stage of the present invention at carbon dioxide pressures ranging between about ordinary atmospheric pressure and about 2 atmospheres gauge, and at temperatures ranging between about 60° F. and about 150° F. The water produced by the carbonation reaction is carried off by the excess carbon dioxide.

In the most preferred embodiment of this invention, there is provided a process for the encapsulation of particles comprising:

a. adding to a conventional coating drum the particles to be encapsulated along with the metallic oxide or hydroxide which is to coat the particles and to be carbonated to form the encapsulating material, b. rotating the drum so as to achieve adherence of the coating material to the particles, c. introducing carbon dioxide into said coating drum by means of a sparger, an apparatus emitting carbon dioxide directly into the rotating bed of particles, and d. removing the encapsulated particles from said coating drum.

In another more specific, preferred embodiment of this invention, there is provided a process for continuous encapsulation comprising:

1. introducing into the upper end of an open ended, inclined rotating cylinder, the particles and the metallic oxide or hydroxide; wherein the initial coating of the fertilizer particles is effected in the upper end of the cylinder, 2. introducing into the lower end of the inclined cylinder a stream of carbon dioxide in a direction countercurrent to the fertilizer and in an amount sufficient to achieve carbonation and encapsulation as the fertilizer particles descend, and 3. collecting the encapsulated particles at the lower end of the inclined rotating drum.

Additionally, a fluid bed technique can be utilized in the practice of the present invention. Thus, the particles to be coated can be introduced into a fluid bed composed of finely ground hydroxide or metal hydroxide wherein they become coated with the powder. Carbonation can then be effected in a separate zone and the encapsulated particles recovered therefrom.

Additionally, the present invention can be practiced by utilizing a conveyor belt whereon the particles and the powdered hydroxide are placed, the belt agitated so as to cause adhesion of the coating material to the particles, and subsequent subjection of the belt to an atmosphere of carbon dioxide wherein the in situ carbonation-encapsulation is effected.

This invention is further illustrated by the following examples, but it is to be understood that they should not be construed as limiting the invention in any manner whatsoever.

In each of the following examples, Examples 1–5, 60 pounds of prilled urea were added to a conventional coating drum along with varying amounts of finely divided calcium hydroxide and 30 grams of water to achieve maximum adherence of the powder to the prilled urea particles. The drum was rotated until uniform coating of the urea prills by the calcium hydroxide powder was achieved. The temperature of the drum was maintained at 110° F. An amount of carbon dioxide, as specified in the accompanying table, added at the rate therein specified, was injected into the rotating bed of coated urea prills. After completion of the carbon dioxide addition, the encapsulated particles were removed.

The data and results from these examples are included in Table III, shown below.

TABLE III

| Example No. | Wt.Ca(OH)$_2$ | Wt.CO$_2$ | Addition Rate CO$_2$ | Wt.Urea Prills | Wt.Encapsulated Products | % Wt. Coating | Capsule-Fertilizer Separation | | |
|---|---|---|---|---|---|---|---|---|---|
| | | | | | | | Wt.Prod. | Wt.Empty Capsules | %Wt.Empty Capsules |
| | | lbs. | lb/min | lbs. | lbs. | | | | |
| 1 | 3 lbs.(in three, 1 lb.additions) | 1.84 | 0.084 | 60 | 62.8 | 4.5 | 100 | 4.5 | 4.5 |
| 2 | 3 lbs.(in two, | 1.84 | 0.084 | 60 | 63.3 | 5.3 | 100 | 5.3 | 5.3 |

TABLE III-continued

| Example No. | Wt.Ca(OH)$_2$ | Wt.CO$_2$ | Addition Rate CO$_2$ | Wt.Urea Prills | Wt.Encapsulated Products | % Wt. Coating | Capsule-Fertilizer Separation | | |
|---|---|---|---|---|---|---|---|---|---|
| | | | | | | | Wt.Prod. | Wt.Empty Capsules | %Wt.Empty Capsules |
| 3 | 1 ½lb. additions) 3 lbs.(in two, 1 ½lb. additions) | 1.84 | 0.084 | 60 | 63.6 | 5.6 | 100 | 5.6 | 5.6 |
| 4 | 1.25 lbs. | 0.8 | 0.084 | 60 | 61.7 | 2.7 | 100 | 2.7 | 2.7 |
| 5 | 1.25 lbs. | 0.8 | 0.084 | 60 | 61.8 | 2.9 | 100 | 2.9 | 2.9 |

In order to determine the weight of the capsule, 100 grams of the product of each of the Examples 1–5 was introduced into 500 grams of water, whereupon the entrained urea dissolved, leaving the empty calcium carbonate capsules as individual entities within the urea-water solution. The empty capsules of the individual examples were separated from the water, washed, dried and weighed.

The data and results for these examples are included in Table III under the heading "Capsule-Fertilizer Separation."

In order to compare the conventional prior art process with the process of the present invention, 100 g. of prilled urea were added to a conventional coating drum in Examples 6 and 7.

In Example 6, 2.5 g. of finely divided calcium carbonate were added to the drum and the drum was rotated for 7 minutes, whereupon the contents were removed and the unadhered powder separated and weighed. The weight of adhered powder was then calculated by difference. The powder coated prills were then returned to the drum along with an additional 2.5 g. of calcium carbonate whereupon the same procedure was repeated. The process was repeated a third time with an additional 5.0 g. of calcium carbonate being added.

In Example 7, 1.85 g. of finely divided calcium hydroxide, equivalent to 2.5 g. of calcium carbonate, was added and the drum rotated and carbonation carried out as per previous Examples 1 to 5. The contents of the drum were then removed, unadhered powder separated and weighed, and the weight of the CaCO$_3$ capsule calculated by difference. The encapsulated product was then returned to the drum and the process repeated a second and a third time with 1.85 g. of calcium hydroxide and 3.7 g. of calcium hydroxide respectively, corresponding to 2.5 g. and 5.0 g. of calcium carbonate, respectively.

The data and results for these examples are included in Table IV. The examples show that the total weight of the coating is not appreciably increased by subjecting the coated particle to repetition of the basic conventional coating procedure as shown in Example 6. Subjection of the encapsulated product of the present invention to re-encapsulation as exemplified by Example 7 does result in an increase in total weight of the capsule.

TABLE IV

| Ex. No. | Total Wt. CaCO$_3$ Added | Total CaCO$_3$ Adhered | % of Total Wt. of CaCO$_3$ Adhered |
|---|---|---|---|
| 6 | 2.5 g. | 2.0 g. | 80% |
| | 5.0 g. | 2.1 g. | 42% |
| | 10.0 g. | 2.2 g. | 22% |
| 7 | 2.5 g.[1] | 2.5 g. | 100% |
| | 5.0 g. | 4.5 g. | 90% |
| | 10.0 g. | 9.0 g. | 90% |

[1]equivalent amount of Ca(OH)$_2$ added.

From the above, it will be understood that the foregoing description is merely illustrative of preferred embodiments and specific examples of the present invention, and that variations may be made in such embodiments and examples by those skilled in the art without departing from the spirit and purview thereof.

What is claimed is:

1. A process for the encapsulation of particles by substantially water insoluble metallic carbonate salts comprising:
   a. coating the particles with a finely divided solid material comprising the corresponding metal hydroxide of the metal carbonate; and
   b. subjecting the coated particles to an atmosphere containing carbon dioxide for a time sufficient to at least substantially convert the hydroxide content of said coating to the corresponding carbonate.

2. A process for encapsulation according to claim 1 wherein said metal hydroxide is selected from the group consisting of calcium hydroxide, magnesium hydroxide, and mixtures thereof.

3. A process for encapsulation according to claim 1 wherein said particle is a fertilizer particle.

4. A process according to claim 1 wherein said particle comprises a fertilizer material selected from the group consisting of urea, substituted urea, and mixtures thereof.

5. A process according to claim 1 wherein said finely divided material additionally comprises a source of limestone.

6. A process for the encapsulation of particles by substantially water insoluble metallic carbonate salts comprising:
   a. coating the particles with a finely divided solid material comprising the corresponding metal oxide of the metal carbonate salt, and an amount of water equivalent to at least 0.1% of the total weight of the oxide and particles; and
   b. subjecting the coated particles to an atmosphere containing carbon dioxide for a time sufficient to at least substantially convert the oxide content of said coating to the corresponding carbonate.

7. A process for encapsulation according to claim 6 wherein said particle is a fertilizer particle.

8. A process for encapsulation according to claim 6 wherein said particle comprises a fertilizer material selected from the group consisting of urea, substituted urea, and mixtures thereof.

9. A process for encapsulation according to claim 6 wherein said metal oxide is selected from the group consisting of calcium oxide, magnesium oxide, and mixtures thereof.

10. A process according to claim 6 wherein said finely divided solid material additionally comprises a source of limestone.

* * * * *